United States Patent [19]

Blaimschein et al.

[11] Patent Number: 5,064,130
[45] Date of Patent: Nov. 12, 1991

[54] CUTTING PLANT FOR CUTTING BLANKS OUT OF A STARTING STRIP

[75] Inventors: Gottfried Blaimschein, Steyr, Austria; Robert A. Postier, Corona, Calif.; D. J. Pilkington, Kettering, England

[73] Assignee: GFM Holding Aktiengesellschaft, Steyr, Austria

[21] Appl. No.: 417,265

[22] Filed: Oct. 5, 1989

[51] Int. Cl.$^5$ .................... B26D 7/06; B65H 27/00
[52] U.S. Cl. .................... 242/56 R; 156/384; 156/584; 156/344; 83/649
[58] Field of Search ............ 83/650, 649, 861, 701; 156/584, 344, 380.1, 73.3, 270, 506, 157, 257, 267, 268, 384; 242/56 R, 56.8, 58.1

[56] References Cited

U.S. PATENT DOCUMENTS

| | | | |
|---|---|---|---|
| 3,360,210 | 7/1967 | Frisbie | 242/56.8 X |
| 3,667,664 | 6/1972 | Schraeder | 226/44 X |
| 3,756,880 | 9/1973 | Graczyk | 156/73.3 |
| 3,821,917 | 7/1974 | Matonka | 23/650 X |
| 4,028,167 | 6/1977 | Gerber | 156/384 |
| 4,282,056 | 8/1981 | Okui | 156/584 X |
| 4,346,855 | 5/1952 | Biggar, III | 242/76 X |
| 4,481,053 | 11/1984 | Tokono et al. | 242/56 R |
| 4,514,246 | 4/1985 | Forrer et al. | 156/384 X |
| 4,596,171 | 6/1986 | Gerber | 83/701 X |
| 4,599,125 | 7/1986 | Duck | 156/584 X |
| 4,631,110 | 12/1986 | Tsumura et al. | 156/584 |
| 4,844,371 | 7/1989 | Tahara | 242/75.44 |

FOREIGN PATENT DOCUMENTS

| | | | |
|---|---|---|---|
| 101366A | 2/1984 | European Pat. Off. | 442/56 R |
| 3341651 | 11/1983 | Fed. Rep. of Germany | |
| 2145175 | 7/1987 | United Kingdom | |

Primary Examiner—Daniel P. Stodola
Assistant Examiner—P. Bowen
Attorney, Agent, or Firm—Collard, Roe & Galgano

[57] ABSTRACT

A cutting plant for cutting blanks out of a starting strip comprises a cutting deck, which has a top surface to which a vacuum is applied, a cutting carriage, which is movable over the top surface and is provided with a cutting tool that is adjustable to cut to a defined depth. The plant also comprises a dispenser rotatably mounting a supply roll of the starting strip to be dispensed onto the top surface and a take-up device rotatably mounting a take-up roll. To permit an efficient cutting operation, the dispenser comprises a brake for braking the starting strip between the supply roll and the cutting deck and the take-up device has a drive for intermittently driving the take-up roll under the control of a measuring device for measuring the length of processed material which is to be taken up.

10 Claims, 2 Drawing Sheets

CUTTING PLANT FOR CUTTING BLANKS OUT OF A STARTING STRIP

BACKGROUND OF THE INVENTION

1. Field of the Invention

This invention relates to a cutting plant for cutting blanks out of a starting strip consisting particularly of a prepreg which is covered with facing film on one side or both sides, which plant comprises a cutting deck, which has a top surface to which a vacuum can be applied, a cutting carriage which is movable over said top surface and is provided with a cutting tool that is adjustable to cut to a defined depth and which preferably vibrates at an ultrasonic frequency, a dispenser for rotatably mounting a supply roll of said starting strip to be dispensed onto said top surface and a take-up device for rotatably mounting a take-up roll.

2. Description of the Prior Art

In the technology of fiber-reinforced plastics the term prepreg is used to describe a preimpregnated fibrous material which has been impregnated with a reactive resin composition in a predetermined proportion and can be cured under the action of heat without an application of pressure and without a need for further additives. That starting material is prefabricated as a strip which is covered by a facing film on one side or both sides and can be sound up to form a roll and can subsequently be processed in a suitable cutting plant, in which the desired blanks are cut out of the strip along a contour line which has been designed in consideration of the desired final product. In order to minimize waste, the several blanks should constitute a pattern, described as a nest, in which they are as close to each other as possible. In order to cut such blanks from the strip in the previous practice, the strip, which constitutes a supply roll in a dispenser at the receiving end of the cutting deck, is withdrawn by hand or by a gripper from the supply roll and is pulled over the top surface of the cutting deck. Thereafter the cutting unit cuts into the portion of the strip which lies on the top surface of the cutting deck and in accordance with a program cuts the blanks out of the piece of material which lies on the top surface of the cutting deck, which is described as a vacuum deck because the material is retained on the deck by a vacuum applied to its top surface. After the cutting operation the blanks are removed from the deck by hand and the waste is discarded before another length of strip is withdrawn from the supply roll and placed on the cutting deck. For this reason each cutting operation is restricted to a predetermined piece of material, which has the same length as the deck, i.e., the nest can have only a limited length. Because this restricts the freedom in the design of the nest, the proportion of waste is large and the feeding and removal of material to and from the cutting deck and the sorting of the blanks and of the waste are time-consuming and involve a high expenditure of work. As known cutting plants which operate efficiently and are highly automated and in which cutters which vibrate at an ultrasonic frequency can be adjusted to cut to a certain depth, such as the cutters known from British Patent Specification 2,148,175, have proved most satisfactory, the need for a manual handling of the material adversely affects the entire production sequence to a considerable degree.

Published German Patent Application 3,340,651 discloses a cutting plant in which the top surface of a cutting deck is preceded and succeeded by respective rolls of strip material. But said rolls of strip material are freely rotatably mounted and the strip which extends on the top surface of the cutting deck between said rolls must be pulled by the movable cutting carriage, which carries grippers, so that the material can be unwound and taken up. That arrangement will not permit the handling of the strip and the separation into blanks and waste to be effected with a higher efficiency.

It has also been proposed to accelerate the sequence of operations by the provision of a cutting deck which consists of a pallet deck so that two or more pallets may be used and the waste may be separated from the blanks at a location which is remote from the cutting deck and cutting and sorting operations can be performed on the same time. But that faster processing involves a higher structural expenditure for the pallet deck and even the use of the pallet deck does not permit a nest to be designed which is longer than the pallet. Similar remarks are applicable to known conveyor decks, in which the top surface is constituted by a conveying belt rather then by replaceable pallets. In that case the blanks and the waste are conveyed to a collecting container when the cutting operation proper has been performed and the blanks and waste are separated outside the cutting station. In that case too the length of the nest is substantially limited by the length of the top surface which is constituted by the conveying belt and the use of a conveying belt gives rise to difficulties in the cutting operation. Moreover, in plants comprising a pallet deck and a conveyor deck the application of a vacuum to the top surface of the deck and, as a result, the retention of the strip as it is cut, are unsatisfactory.

SUMMARY OF THE INVENTION

It is an object of the invention to eliminate said disadvantages and to provide a cutting plant which is of the kind described first hereinbefore is relatively simple in design and can be operated with a high efficiency while permitting the application of pieces of material in any desired nest length to the top surface of the cutting deck, also permitting the material to be supplied and withdrawn substantially automatically and without adversely affecting the cutting operation, and further permitting a continuous and highly automatic separation of blanks and waste.

That object is accomplished in accordance with the invention in that the dispenser comprises a brake for braking the starting strip between the supply roll and the cutting deck and the take-up device is provided with drive means for intermittently driving the take-up roll under the control of a measuring device for measuring the length of processed material which is to be taken up. When a new supply roll has been mounted in the dispenser and the strip has been dispensed from the supply roll and fixed to the take-up roll by hand, the cutting operation can be performed without any further manual action and the dispensing and delivery of material to and from the cutting deck can be controlled exactly in dependence on the desired cutting operation. Whereas a simple vacuum deck having no moving parts is used, nests having any desired length can be designed since the material is dispensed and taken up in suitable length. Because the take-up roll is intermittently driven, the cutting conditions under which the several blanks are cut out will remain unchanged. As the strip will be advanced in steps as required, that stepwise advance will permit the cutting carriage to process a nest in any desired length although the top surface of the deck has only a limited length. After the cutting operation, at least part of the processed material consisting of the blanks and of the waste can be taken up on the take-up roll so that there will be no delay caused by the removal of the blanks. When a processed material in a predetermined length has been taken up on the take-up roll, the latter is removed from the take-up device and may be delivered to a separate deck on which the blanks can be removed from the waste by hand or to a deck on which said blanks are automatically removed from the waste by robots or to a refrigerator for an intermediate storage or to a station for further processing.

It will be understood that the processed strip cannot be taken up unless the waste and the blanks have a certain cohesion to each other after the cutting operation. For this reason the cutting carriage must comprise a cutting tool which will cut only to a limited depth. If it is desired to produce blanks which are covered by a facing film only on one side, the starting strip which is film-covered on its top and bottom will not be cut through the bottom facing film so that the bottom facing film will permit the strip that has been cut to a limited depth to be taken up because the bottom facing film has not been cut through. If the blanks are to be provided with facing films on the top and bottom, it will be necessary in most cases to provide a separate backing film. This may be accomplished in accordance with the invention in that a second dispenser provided with a supply roll consisting of a backing film, which may be placed under the starting strip, is provided between the dispenser for the starting strip and the receiving edge of the deck. As the starting strip is dispensed from the associated dispenser, that backing film is continuously dispensed in unison with the starting strip and, when the starting strip has been cut through, the backing film will ensure that the blanks and waste will have the cohesion which is required for the taking up of the processed material on the take-up roll. The blanks will have a certain adhesion to the backing film, which must not be cut through together with the starting strip.

In a particularly desirable embodiment of the invention, the dispenser comprises a supply roll magazine for rotatably mounting at least two of said supply rolls, each of which is selectively movable to a dispensing position, in which the leading end of the starting strip is clamped by clamping means to protrude toward the receiving edge of the deck approximately in the direction in which the starting strip is to be dispensed, the receiving edge of the deck is preferably constituted by an edge flap, which is adapted to be swung down, and a joining station for joining the leading end of the starting strip which protrudes from the clamping means and the trailing end of a starting strip lying on the deck is provided adjacent to the receiving edge of the deck. The joining station may be provided with a top roll of adhesive tape and preferably with a bottom roll of adhesive tape. Said rolls of adhesive tape are adapted to be engaged with the preceding and succeeding starting strips adjacent to the joint between them and the adhesive tapes are adapted to be unwound from the rolls of adhesive tape transversely to the longitudinal direction of the tape. That supply roll magazine permits an automatic selection of the starting strip so that blanks can be made from different starting materials in one and the same sequence of operations. When a change from one starting strip to another is desired, the starting strip which has been withdrawn from the supply roll which is just in dispensing position is cut off by the cutting carriage along the receiving edge of the cutting deck and the supply roll magazine is caused to move the supply roll consisting of the desired new material to the dispensing position and to remove the previous supply roll from that position. The leading end of that new starting strip is then joined to the cut off trailing end of the previous starting strip lying on the cutting deck and the cutting operation can then be continued. Because the two starting strips have been joined, it is not necessary to thread the new starting strip in the plant and both starting strips are taken up on one take-up roll regardless of the sequence of materials being processed so that delays in the cutting operation will be avoided. To permit a joining of the trailing and leading ends of consecutive starting strips, the joining station may be provided with welding or stapling devices. It will be particularly desirable to provide in the joining station a sticking device, which is provided with at least a top roll of adhesive tape for adhesively joining the top facing films. A firmer joint between consecutive strips will mainly be required if an additional backing film is not placed below the starting strips and may be obtained if the top and bottom facing films are joined by respective adhesive tape rolls. In that case an engagement of the bottom roll of adhesive tape with the bottom facing film will be permitted if the cutting deck is provided with an edge flap which can be swung down and constitutes the receiving edge of the deck. When said flap has been swung down, the adjoining ends of the starting strips are accessible to the rolls of adhesive tape on both sides. The clamping means for clamping the starting strip adjacent to the supply roll magazine will ensure an aligning of the leading end of the new starting strip and preferably serve also as a brake for the strip as it is dispensed from the supply roll which is in dispensing position.

Within the scope of the invention, a stationary portal which bridges the starting strip may be provided at that end of the deck which is adjacent to the take-up device and a marking slider comprising a marker for marking the blanks and/or waste and/or for providing inscriptions on the blanks and/or waste may be slidably mounted in said portal. Whereas it is known to provide markers in combination with the cutting carriage or to provide marking carriages which are movable over the top surface of the deck like the cutting carriage, such arrangements involve a large additional expenditure and permit a marking of the processed material only when it is at a standstill. On the other hand, if a stationary portal is provided in which a marking slider is mounted for a movement transversely to the longitudinal direction of the processed material, then it will be possible to provide the processed material with the inscription or marking in a simple and quick manner as the processed material is delivered and undesired standstill times and delays in the sequence of operations will not be required.

In a particularly desirable embodiment of the invention, a peeling roller is provided, which is adapted to be lowered into engagement with the processed material and to peel the waste material from the blanks, a waste take-up roll is provided, which is disposed above the first-mentioned or main take-up roll and is adapted to take up the waste which has been peeled by the peeling roller, and drive means are provided for rotating said waste take-up roll in dependence on the operation of the means for driving the main take-up roll. A deflecting roller which is engageable from below with the processed material is preferably associated with the main take-up roll and in the direction of movement of the processed material succeeds the peeling roller. That combination of a waste take-up roll, the peeling roller and the cutting unit for cutting to a defined depth permits an automatic separation of the blanks and waste. Within the scope of the invention it is sufficient to cut the blanks in such a manner that a backing film consisting either of the bottom facing film or the backing film may be left uncut and the waste consisting of the lands of material left between the blanks and the associated portions of the facing films can then be upwardly deflected by the peeling roller and taken up on the waste take-up roller and the backing film provided with the blanks may be advanced further and taken up on the main take-up roll. In that case the waste will continuously be separated from the processed material as it is delivered. As the starting strip is threaded into the system, the top facing film provided with the first waste portions must be taken up on the waste take-up roll and the waste will then automatically be peeled and taken up during the winding operation because as the lands remaining between the blanks are upwardly deflected they are detached and entrained. As a result, the main take-up roll will receive only a processed material which consists of the blanks and the correspondingly cut top facing film pieces and the uncut bottom facing film. The deflecting roller will facilitate the peeling of the waste in an upward direction and will ensure that an undesired removal of blanks from the bottom facing film or from the backing film will be avoided. It will be understood that the portions which are taken up on the main take-up roll and on the waste take-up roll must move at a synchronous speed as the waste is peeled. This can be achieved without difficulty by the provision of suitable measuring and control means. Besides, the nests of blanks must be so designed that a continuous waste will remain after the cutting operation and the lands and the marginal portions of the waste have at least a certain width so that the waste can be peeled off and taken up without being torn. That automatic separation of the waste and blanks will permit the entire sequence of operations to be performed with a much higher efficiency after the cutting operation.

DETAILED DESCRIPTION OF THE PREFERRED EMBODIMENTS

Figure 1:
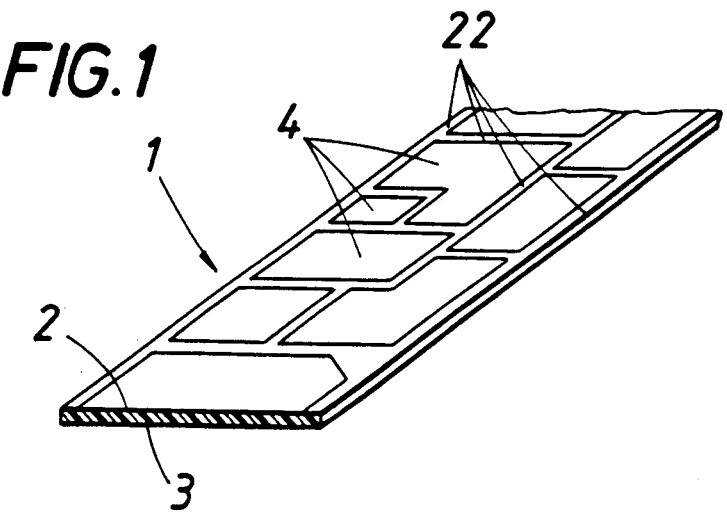
FIG. 1 is a perspective view showing partly in section a material which has been processed on a cutting plant in accordance with the invention.

Embodiments of the invention will now be explained in more detail with reference to the drawing.

The cutting plant 5 is operable to cut discrete blanks 4 out of a starting strip 1 consisting of prepreg sections which are covered with top and bottom facing films 2, 3. The blanks 4 are to be cut out of the starting strip 1 efficiently in accordance with a predetermined pattern. The cutting plant 5 comprises a cutting deck 6, which has a top surface 7, to which a vacuum can be applied from below (see vacuum box indicated in broken lines below top surface 7). The cutting plant also comprises a cutting carriage 8, which is movable over the top surface 7 and comprises a cutter blade 9, which vibrates at an ultrasonic frequency, is guided to perform the cutting operation and is operable to perform a cut along a selected contour line to a predetermined adjustable depth. Material is dispensed to the cutting deck 6 from a supply roll 10, which is rotatably mounted in a dispenser. A brake 11 is provided for braking the starting strip 1 as it is dispensed. At the beginning of the processing of the strip 1, the latter is withdrawn from the supply roll 10 and is pulled over the top surface 7 by hand until the leading end of the starting strip 1 can be gripped in a take-up roll 12 of a take-up device. The take-up device comprises take-up roll drive means 13 for intermittently driving the take-up roll 12 so that the processed material will be taken up in steps which correspond to the progress of the cutting operation. The length in which the processed material is to be taken up in one step is measured by a length-measuring device, which causes the take-up roll drive means 13 to operate the take-up roll 12 so that it will take up the desired length of processed material. In that case blanks 4 can be cut out of the strip 1 in a nest of any desired design and the cut pieces can be moved away from the cutting deck 6 as the strip 1 is advanced. Adjacent to the delivering edge of the cutting deck 6, the measuring device comprises a roller 14, around which the processed material is trained. When the measuring device has indicated that processed material in a predetermined length has been delivered from the top surface 7 across the delivering edge, the take-up roll drive means 13 are stopped and the cutting tool 9 is operated to cut into the starting strip 1 on the top surface 7 in accordance with the predetermined program, which also determines the length in which the processed material is taken up on the take-up roll 12 in each of a series of consecutive steps. In the embodiment shown in FIG. 2, the processed material consisting of the blanks and the waste are wound up on the take-up roll 12. When that take-up roll 12 has been removed from the plant, the manner and the location by and at which the blanks 4 are removed from the processed strip and whether the material is processed further immediately or may temporarily be stored first can freely be chosen.

When the blanks have been cut out, the parts must cohere if they are jointly to be taken up. For this reason the cutting carriage 8 must cut only to a limited depth and must not cut through bottom facing film 3. If blanks are required which have only a top facing film, the cutting carriage 8 may cut through the starting strip 1 and through the top facing film 2 so that the bottom facing film 3 is left as a backing film. If blanks 4 are to be cut out of a strip 1 which is provided with top and bottom facing films, the bottom facing film 3 must also be cut through and in order to preserve the cohesion a backing film 15 must be placed under the strip 1. For this reason a backing film dispenser is provided, in which a backing film supply roll 16 is rotatably mounted between the supply roll 10 of the starting strip 1 and the cutting deck 6 and the backing film 15 dispensed from the backing film supply roll 16 will move over the top surface 7 of the deck 6 in unison with the starting strip 1 which is withdrawn from the strip supply roll 10. In such an arrangement, the starting strip and the top and bottom facing films 2 and 3 may be cut through because the remaining backing film 15, which remains uncut, will permit the cut strip to be wound up on the take-up roll 12.

Figure 3:
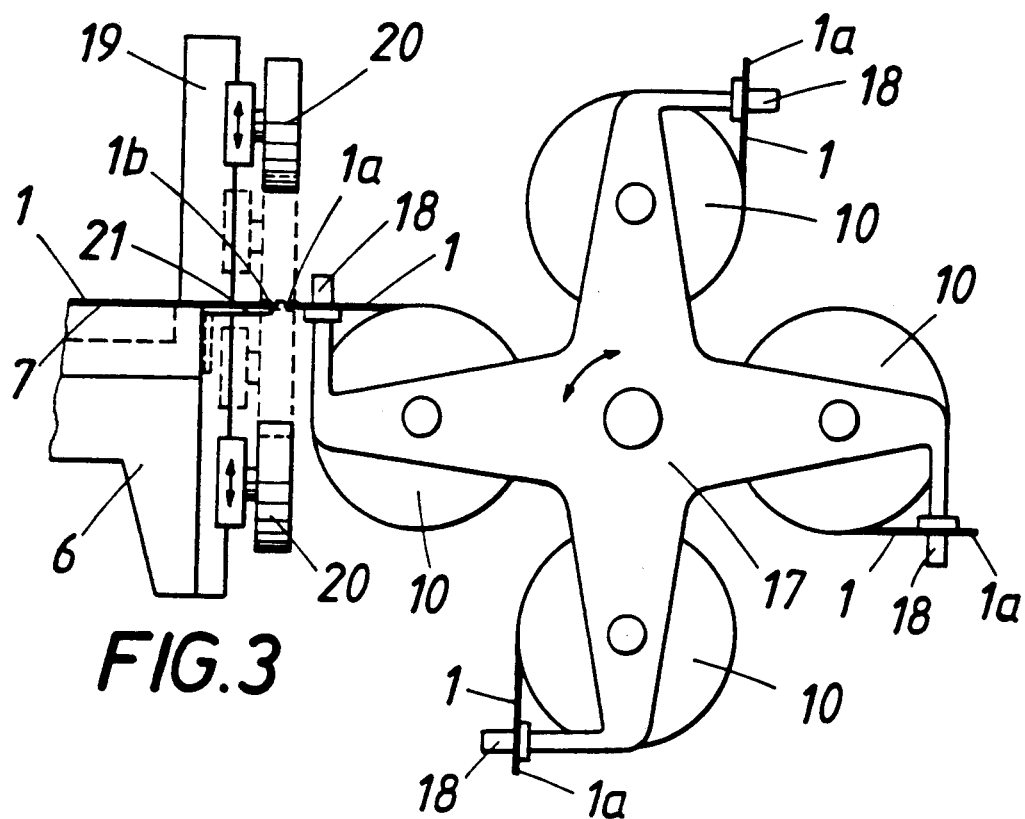
FIG. 3 is a side elevation showing the feeding portion of a modified cutting plant which embodies the invention with a supply roll magazine.

FIG. 3 shows a supply roll magazine 17 which precedes the cutting deck 6 so that different supply rolls 10 consisting of starting strips of different materials may consecutively be cut and processed further. By means of the supply roll magazine 17, each of the supply rolls 10 rotatably mounted in that magazine may be moved to a dispensing position, in which the leading end 1a of the starting strip 1 of that roll is held by clamping means 18 so that said leading end 1a protrudes from the clamping means approximately in alignment with the top surface 7. The clamping means 18 may consist of a clamping bar, which serves also as a brake for the supply roll 10 which is in a dispensing position. The leading end 1a which is held by the clamping means 18 will then abut the trailing end 1b of the starting strip 1 which lies on the cutting deck 6 and has previously been cut to length. In that case a joining station 19 provided with two rolls 20 of adhesive tape can be operated to adhesively join the starting strips so that the new starting strip is joined to the preceding one and the cutting operation can be continued without an interruption. If a further starting strip is to be processed, the cutting carriage 8 is moved to the receiving edge of the cutting deck and is operated to cut through the starting strip there, whereafter the supply roll magazine moves the desired new supply roll to its dispensing position, in which its leading end 1a must be joined to the trailing end 1b at which the previous starting strip 1 has just been cut off. The rolls 20 of adhesive tape are then engaged with the previous and new starting strips 1. To permit the use of top and bottom rolls of adhesive tape, the cutting deck 6 is provided at its receiving end with an edge flap 21, which can be swung down to permit an access of the bottom roll 20 of adhesive tape to the underside of the previous and new starting strips 1. When the two starting strips have been adhesively joined, the cutting operation is performed as before and the consecutive strips which have been cut are wound on the take-up roll 12 regardless of the sequence of materials employed.

Figure 4:
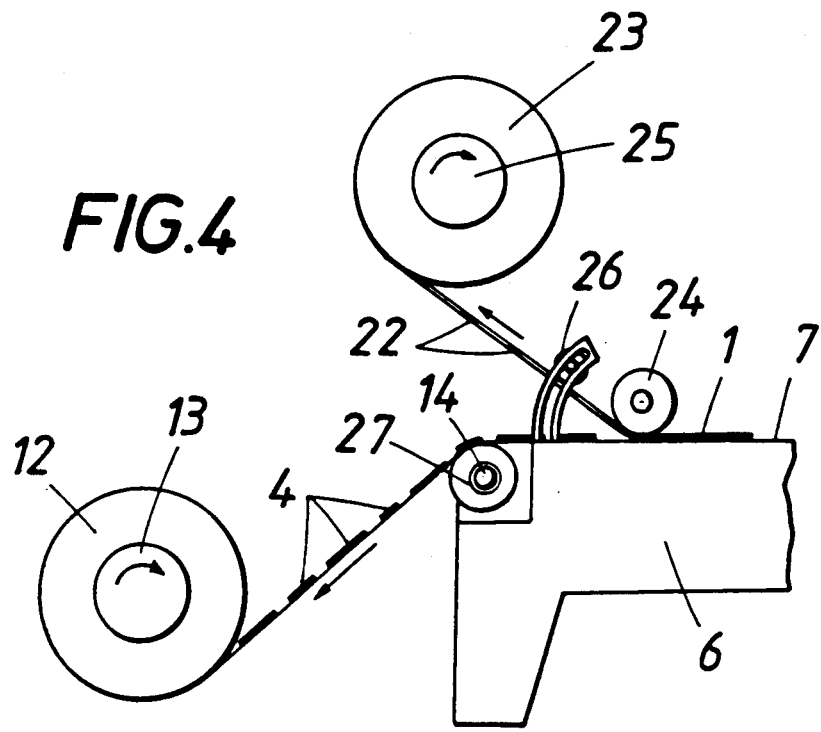
FIG. 4 is a side elevation showing the delivery and take-up portion of a modified cutting plant in accordance with the invention with main and waste take-up rolls.

After the cutting operation, it may be desirable to separate the waste from the blanks. The waste consists of the lands left between the blanks 4 and of an edge lands 22. This can be accomplished if, as is shown in FIG. 4, a waste take-up roll 23 is provided above the take-up roll 12, which is now described as a main take-up roll. The waste take-up roll 23 cooperates with a peeling roller 24, which is adapted to be lowered into engagement with the top surface of the processed material near the delivery edge of the cutting deck 6. When the waste at the leading end of the processed material has been trained by hand around the peeling roller 24 and fixed to the waste take-up 23, the peeling roller 24 will automatically peel the entire waste 22 from the blanks 4 and the bottom facing film and said waste will be taken up on the waste take-up roll 23. If the bottom facing film 3 has not been cut, the blanks 4 will remain on the bottom facing film 3 and will be wound up on the main take-up roll 12. If the bottom facing film 3 has also been cut through and a backing film 15 has been provided, the blanks 4 will remain on the backing film 15 and the waste together with the associated portions of the top and bottom facing films will be taken up on the waste take-up roll 23. The strip portions which must be separated from each other must be withdrawn at the same speed. This is ensured since the means 25 for driving the waste take-up roll 23 are controlled by a dancer roller 26 for sensing the film tension or by other sensing means in dependence on the means 13 for driving the main take-up roll 12. The separation of said strip parts and the guidance thereof will be facilitated by a deflecting roller 27, which is associated with the main take-up roll 12 and in the direction of movement of the processed material succeeds the peeling roller 24.

Figure 2:
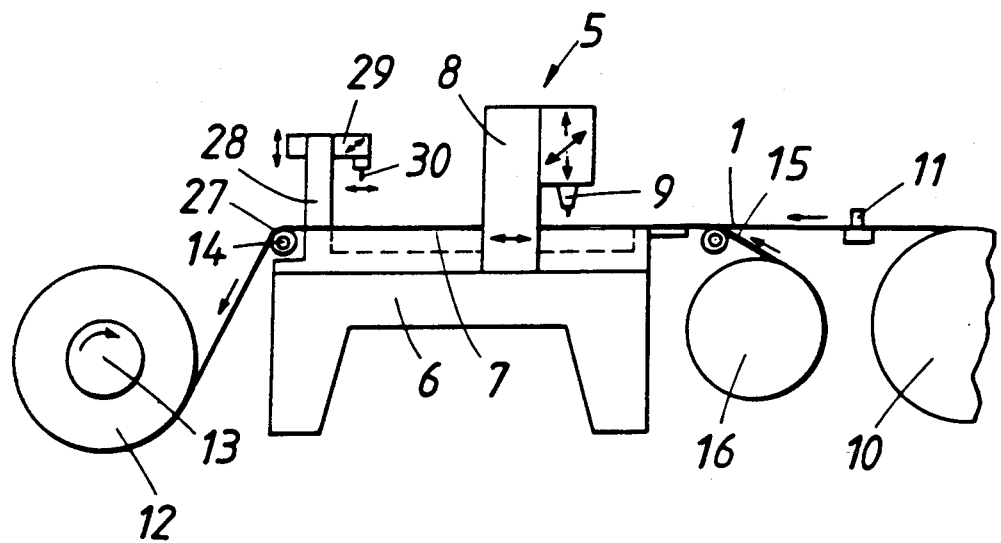
FIG. 2 is a side elevation showing a cutting plant which embodies the invention.

As is indicated in FIG. 2, a stationary portal 28 which bridges the processed material may be provided at the delivery end of the cutting deck 6 and a marking slide 29 provided with a marking device 30 may be movably mounted on that portal. In that case the blanks 4 or the waste may be provided with marks as the processed material is delivered and this can be accomplished without arresting the processed material from time to time.

We claim:

1. A plant for cutting blanks out of a starting strip, comprising a cutting deck comprising a flap arranged to be swung down and having a free end constituting a receiving edge and a delivery edge, and a top surface extending between said receiving and delivery edges, the top surface being subjected to a vacuum from below, a cutting carriage mounted to be movable over said top surface and comprising a cutting tool operable to cut from above into a starting strip lying on said top surface to an adjustable depth to produce processed material from said starting strip, a starting strip dispenser disposed adjacent to said receiving edge and comprising a magazine rotatably mounting at least two supply rolls of said starting strip to dispense respective starting strips from said supply rolls across said receiving edge onto said top surface, the magazine being selectively movable to move each of said supply rolls to a predetermined dispensing position, said strip dispenser further comprising clamping means for clamping a leading end of said starting strip of each of said supply rolls, when it is in said dispensing position, so that said leading end protrudes from said clamping means generally toward said receiving edge of said top surface, and further comprising a joining station adjacent to said receiving edge and operable to join said leading end and a trailing end of a preceding starting strip lying on said cutting deck, a take-up device adjacent to said delivery edge and rotatably mounting a take-up roll consisting of at least part of said processed material, braking means for braking said starting strip as it is dispensed from a respective one of said supply rolls to said top surface, take-up roll drive means for rotating said take-up roll to wind up said processed material so as to cause said starting strip to be dispensed from said supply roll across said receiving edge onto said top surface and said processed material to be delivered from said top surface across said delivery edge to said take-up roll, length-measuring means for measuring the length in which said processed material has been delivered from said top surface across said delivery edge toward said take-up roll, and said take-up roll drive means being arranged to be arrested when said length-measuring means indicates that a predetermined length of said processed material has been delivered from said top surface across said delivery edge.

2. The plant set forth in claim 1, further comprising a backing film dispenser between the starting strip dispenser and the receiving edge of said top surface, the backing film dispenser rotatably mounting a roll of a backing film and being arranged to feed said backing film across said receiving edge to said top surface under said starting strip.

3. The plant set forth in claim 1, wherein said joining station rotatably mounts a top roll of an adhesive tape above said cutting deck adjacent to said receiving edge and is operable to lower said top roll into engagement with said leading end of the starting strips of each supply roll and the trailing end of the preceding starting strip and to unwind said adhesive tape from said top roll onto said leading and trailing ends transversely to the longitudinal direction of said starting strips.

4. The plant set forth in claim 3, wherein said joining station rotatably mounts a bottom roll of adhesive tape below said cutting deck adjacent to said receiving edge and is operable to raise said bottom roll into engagement with said leading end of the starting strips of each supply roll and the trailing end of the preceding starting strip and to unwind said adhesive tape from said bottom roll onto said leading and trailing ends transversely to the longitudinal direction of said starting strips.

5. The plant set forth in claim 4, wherein
said flap is arranged to be swung down to expose the underside of said leading and trailing ends for the engagement by said second roll of adhesive tape.

6. The plant set forth in claim 1, further comprising
a portal bridging said processed material above the same and disposed adjacent to said delivery end of said cutting deck and
a marking slide movably mounted on said portal and comprising a marking device for marking said processed material as it is moved toward said take-up roll.

7. The plant set forth in claim 6 as applied to a cutting plant in which said cutting tool is operable to cut into said starting strip to said cutting depth so as to produce a processed material consisting of blanks and waste, wherein
said marking device is operable to mark said blanks as said processed material is delivered toward said take-up device.

8. The plant set forth in claim 6, as applied to a cutting plant in which said cutting tool is operable to cut into said starting strip to said cutting deck so as to produce a processed material consisting of blanks and waste, wherein
said marking device is operable to mark said waste as said processed material is moved toward said take-up device.

9. The plant set forth in claim 1, as applied to a cutting plant in which said cutting tool is operable to cut into said starting strip to said cutting deck so as to produce a processed material consisting of blanks and waste, wherein
said take-up device comprises a peeling roller rotatably mounted above said top surface adjacent to said delivery edge and is arranged to be lowered onto said processed material on said cutting deck and to deflect said waste upwardly from said top surface,
comprising a waste take-up roll arranged to receive said waste from said peeling roller,
said take-up device further comprising drive means for rotating said waste take-up roll so as to wind up said waste on said waste take-up roll in dependence on the operation of said take-up roll drive means.

10. The plant set forth in claim 9, wherein
said take-up device comprises a deflecting roller, disposed below said processed material as it moves from said delivery edge to said take-up roll,
said take-up device being operable to raise said deflecting roller into engagement with the underside of said processed material as it moves toward said take-up roll when said waste has been peeled by said peeling roller from said processed material.

* * * * *